June 8, 1965 H. KRAUSE 3,188,126
SELF-ADJUSTING LATCH STRUCTURE
Filed June 25, 1963 2 Sheets-Sheet 1
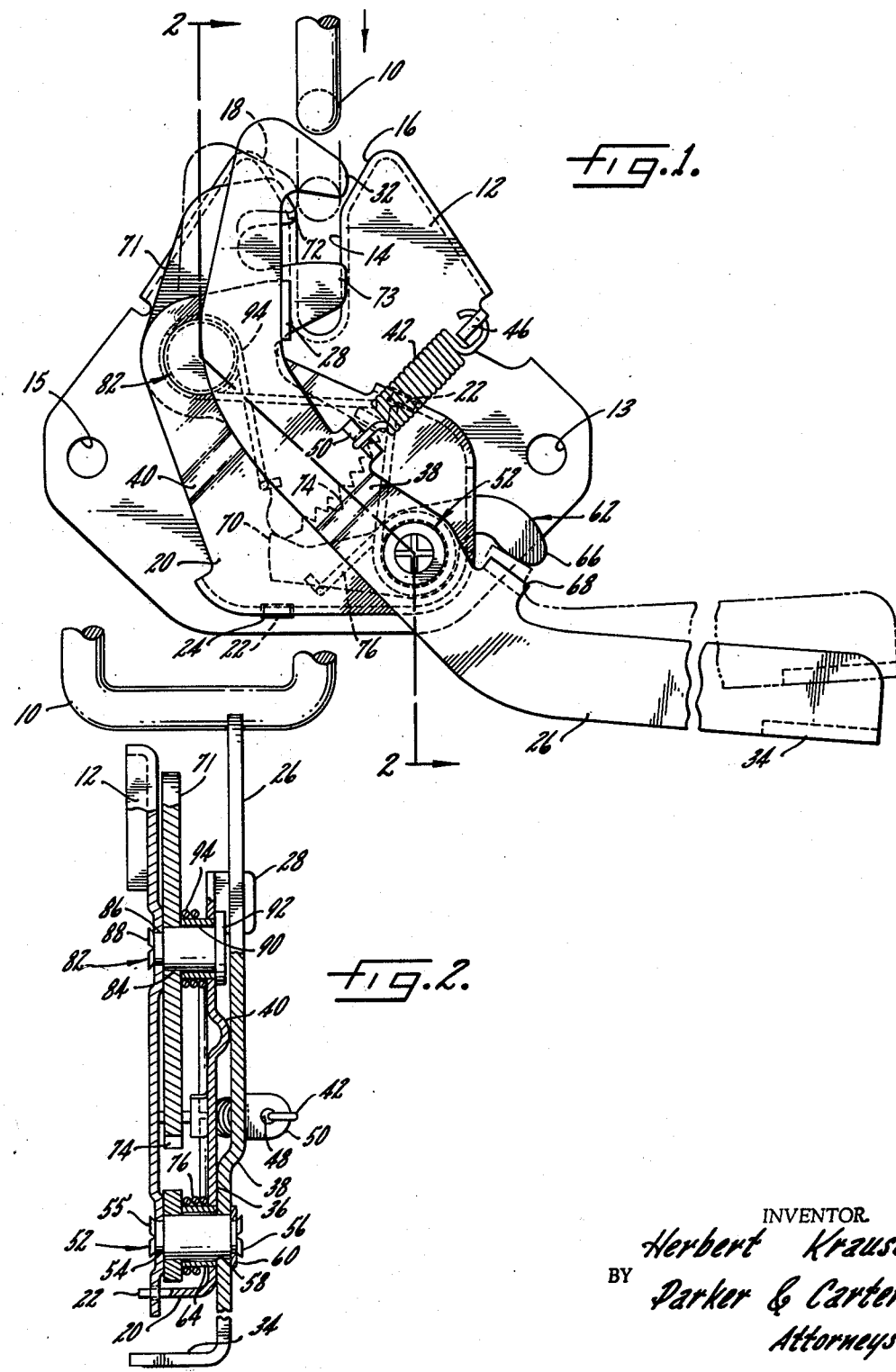
INVENTOR.
Herbert Krause,
BY Parker & Carter
Attorneys.

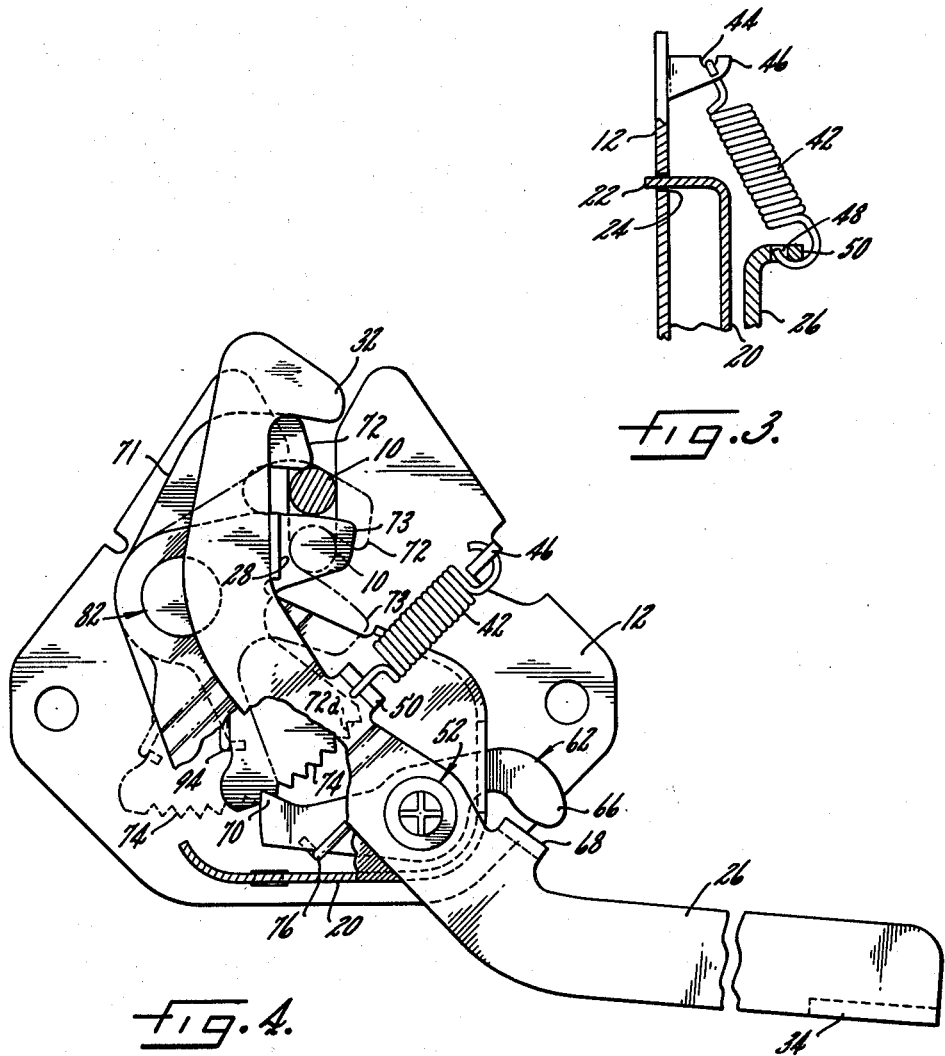

United States Patent Office 3,188,126
Patented June 8, 1965

3,188,126
SELF-ADJUSTING LATCH STRUCTURE
Herbert Krause, Rockford, Ill., assignor to Chicago Forging and Manufacturing Company, Rockford, Ill., a corporation of Illinois
Filed June 25, 1963, Ser. No. 290,380
1 Claim. (Cl. 292—11)

This invention relates to a latch structure and particularly relates to a latch structure for automobiles.

An object of this invention is an effective and simplified self adjusting latch structure for automobile hoods, luggage compartment doors and the like.

Another object is an automobile latch structure in which a reduced number of pivot points are required for the working latches.

Another object is an automobile latch structure in which a simple interlock is provided by an elongated striker in a slotted plate.

Another object is an automobile latch structure wherein an adjustable locking range is provided which is generally coincidental with the length of an open slot in a plate.

Another object is an automobile latch structure in which the working latches are positioned to have the engaging ends moved to a common slot located in a plate to provide an efficient and simplified intelock for the hood, for example, of an automobile.

Another object is an automobile latch structure in which locking and adjusting means are compactly positioned within a housing and a safety lock is securely positioned outside said housing.

Another object is an automobile latch structure in which a simple element in the hood or auto body operates as a keeper-striker with a slotted plate in the auto body or hood.

Such objects are attained along with other objects which will become apparent from the disclosed invention which is illustrated in the attached drawings wherein:

FIGURE 1 is a front elevational view with parts indicated in phantom outline;

FIGURE 2 is a view along line 2—2 of FIGURE 1;

FIGURE 3 is a side elevational view showing portions of the latch structure; and FIGURE 4 is a front elevational view with parts removed.

The latch structure has a wire catch 10 which is fixed to the hood of an automobile. Placed directly below the wire catch is a plate 12 which may be fixed to the body of the vehicle by bolts or the like through openings 13 and 15. The top of the plate has a guide slot 14 with an open end defined by diverging side walls as at 16 and 18 to permit the wire catch to enter and strike the locking means. The wire catch operates both as a keeper and a striker.

The compact latch structure has a housing 20 on the plate which encloses locking and adjusting means. The housing may be fitted into the plate by lugs 22 seated in slots such as 24. A safety latch 26 is shown positioned outside the housing. The housing has a stop 28 which intercepts the safety latch short of the slot 14 in the plate. The safety latch has an angular arm, one end of which has locking means shown as a lateral arm or hook 32. The other end has a hand grasping means or handle 34. The safety latch is preferably positioned to bear close against wall 36 of the housing so that the resulting bearing surface tends to guide and support the latch. In this embodiment the safety latch is offset as at 38 so that the upper portions may be free of a pivot, but it may bear against a projection or arcuate ridge 40. The handle extends laterally from the angled safety latch so that the latch rotates to an open position away from the slot when the handle is lifted. The rotation of the safety latch shown in the drawing would be counter-clockwise.

The safety latch is urged or biased toward the closed position at the slot by a coil spring 42. The spring may be affixed at one end to recess 44 in flange 46 from the plate, and at the other end to aperture 48 in lateral flange 50.

The safety latch rotates on a pivot shown generally as 52 which extends from the plate to the housing and safety latch. The safety latch has a hook portion 32 outwardly of the guide slot opening, and this hook portion is adapted to be contacted by the striker. The pivot has a pin 54 which is locked in position by staking or the like 55 and 56. A pivot surface 58 extends from the body of the pivot and this pivot surface is positioned by the plate on one side and by a washer or the like 60 on the other side.

A pawl shown generally at 62 also rotates on this pivot. The pawl is positioned against the plate by an annular spacer band 64 which is seated in an aperture in the wall of the housing. The pawl has an end 66 which is responsively moved by lateral flange 68 on the safety latch when the latter is lifted after it traverses a distance sufficient to bridge the space between latch 26 and pawl end 66. The other end of the pawl has a locking finger 70 which coacts with a locking latch 71 shown as an L shaped arm having laterally extending jaws 72 and 73 at one end and longitudinally extending ratchet teeth 74 at the other end. The locking finger of the pawl is normally urged against the ratchet by a coil spring 76 which may be wound around the spacer band on the pivot.

The locking latch rotates about a pivot shown generally at 82 in which the bearing surface 84 extends from a body 86 that is locked into position by a staking or the like 88. The guide slot 14 is generally aligned between this pivot and pivot 52. These pivots may be differently positioned and constructed. They may, for example, be solid lugs extending from either the housing wall or the plate.

The locking latch is positioned against the plate by an annular spacer band 90. A fixed head 92 fixes the pivot against the housing wall. The jaws of the locking latch are normally urged towards an open position away from the slot by torsion spring 94 which is wound around the spacer band of the pivot.

The use and operation of my invention are as follows:

A simplified latch structure is provided which is compact, easy to operate and simple to install. An elongated element shown herein as a wire catch operates as a combination keeper and striker. This wire catch mounted on one of the members to be latched, coacts with an open ended slot in a latch structure which is secured to the other of the members to be latched. An automobile hood and body may for convenience be considered the members to be latched and the catch 10 may be considered as secured to the hood and the structure 12–94 as secured to the body.

The latch structure has working safety and locking latch portions which operate at a central portion of the plate adjacent the open ended slot. By this arrangement, the latch portions are conveniently positioned to form an interlock with the keeper-striker when the hood is closed, and such latch portions are easily opened or removed from the area of the open slot when the hood is opened. The safety latch is normally urged toward a closed position or a position overlying the slot. The locking latch is normally urged toward an open position or a position away from the slot. When the hood is opened, the latch structure is generally in the position shown in FIGURE 1. When the hood is lowered the keeper striker 10 hits the inclined face of the arm of the safety latch and thereby moves the safety latch to an open position or a position away from the slot. The striker must move the lock latch against the strength of the springs on the latch and pawl. The keeper-striker moves past the shorter upper jaw 72 of latch 71 and contacts the lower longer jaw 73. The continued movement of the keeper striker moves the lower jaw 73 of the locking latch toward a tighter locked position, and jaw 72 is positioned in overlying relationship with the slot. The closing movement of the locking latch causes the ratchet teeth 74 to engage the locking finger 70 of the pawl at an initial locking position as indicated by the solid lines in FIGURE 4. The lower jaw 73 extends across slot 14 at all positions of the locking latch.

The ratchet teeth on the locking latch permit self adjustment by coacting with the pawl. The hood may be more tightly closed by exerting a further downward pressure against the lower jaw 73 and thereby moving the ratchet teeth further in relation to the locking finger of the pawl as the locking latch progresses toward its maximum closed position. When the finger is in the last tooth of the ratchet, the striker is positioned at its furthest inner point in the slot. This maxium locking position is indicated by phantom outline in FIGURE 4, and these positions represent the locking range limits of the latch structure. In this illustration with the catch 10 in its innermost or minimum locking position locking finger 70 will engage an end tooth 72a of the ratchet surface.

The hood is opened by lifting the safety latch to the open position or away from the slot. There is a slight delay in the movement of the safety latch before the locking latch is released. This delay corresponds to the distance between the pawl portion 66 and the flange 68 on the safetylatch. Once the distance is traversed, or the lost motion is completed, the pawl will be released from the ratchet and the locking latch will be urged to an open position or away from the slot by the torsion spring 52. The hood, which is normally urged to the open position, will then spring up.

The advantages of the latch structure reside in its compactness and simplicity. An uncomplicated housing is provided in which pivots rotatably position the locking latch and the pawl against the plate. The safety latch is positioned outside the housing and connected to the same pivot to which the pawl is connected. The safety latch is additionally placed in a secure position by having a common surface portion between it and the housing to thereby provide bearing surfaces. Such an arrangement provides a secure assembly which is still extremely compact.

The foregoing invention can ow be practised by those skilled in the art. Such a skilled person will know that the invention is not necessarily restricted to the particular embodiments presented herein. The scope of the invention is to be defined by the terms of the following claim as given meaning by the preceding description.

I claim:

For use with vehicles having a body member and a hood member, a keepr fixed to one of said members, and a latching structure fixed to the other of said members, said latching structure including a mounting plate, said plate having a slot open at one end to receive said keeper, a locking latch pivoted to said plate, said locking latch having spaced jaws at one of its ends, said jaws being rotatable across said slot to engage said keeper, said locking latch having ratchet teeth at the other of its ends, a housing secured to said plate, said locking latch being pivoted intermediate its ends within said housing and having said spaced jaws extending outwardly from said housing, said locking latch having said ratchet teeth movable within said housing, yielding means engaging said housing and said locking latch and urging said locking latch away from keeper-engaging position, a safety latch pivoted intermediate its ends at a point spaced from said pivot point of said locking latch, said safety latch having a hook portion at one of its ends and a manually operable handle portion at the other of its ends, said safety latch being positioned for movement in a plane outwardly of said housing, a second yielding means secured to said plate and said safety latch and urging said safety latch into keeper-engaging position, a locking pawl pivoted intermediate its ends about the pivot point of said safety latch, said locking pawl having a finger portion adjacent one of its ends, said finger portion being movable within said housing for engagement with said ratchet teeth, said pawl having its opposite end portion extending outwardly from said housing and positioned for engagement by said safety latch handle portion after a lost motion movement of said safety latch handle portion toward non-keeper-engaging position, and a third yielding means engaging said housing and said locking pawl and urging said locking pawl toward engagement with said ratchet teeth.

References Cited by the Examiner

UNITED STATES PATENTS

| | | | |
|---|---|---|---|
| 2,508,090 | 5/50 | Beems et al. | 292—129 |
| 2,846,253 | 8/58 | Johnstone | 292—25 |
| 2,924,473 | 2/60 | Krause | 292—11 |

M. HENSON WOOD, Jr., *Primary Examiner.*